April 28, 1970 — R. J. IFIELD — 3,508,396
FUEL CONTROL APPARATUS FOR GAS TURBINE ENGINES
Filed July 25, 1968
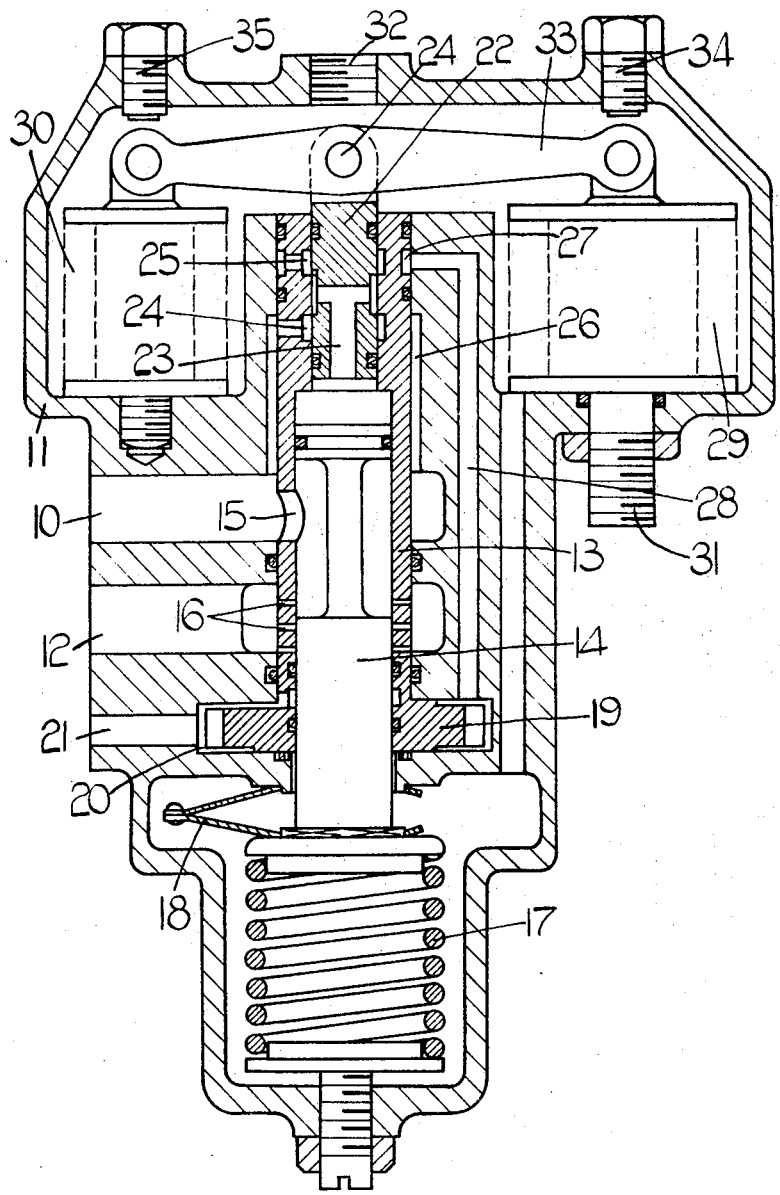
INVENTOR
Richard Joseph Ifield
BY Bleacock, Downing
& Seebold.
ATTORNEYS

United States Patent Office 3,508,396
Patented Apr. 28, 1970

3,508,396
FUEL CONTROL APPARATUS FOR GAS TURBINE ENGINES
Richard Joseph Ifield, Sydney, New South Wales, Australia, assignor to Joseph Lucas (Industries) Limited, Birmingham, England
Filed July 25, 1968, Ser. No. 747,638
Int. Cl. F02c 9/08
U.S. Cl. 60—39.28                              5 Claims

ABSTRACT OF THE DISCLOSURE

Fuel control apparatus for gas turbine engines comprising a throttle which controls the flow of fuel to the engine, a valve for controlling the escape of fuel past the throttle to provide a fuel pressure which is used to position the throttle, a pair of capsules the lengths of which are dependent upon fluid pressures obtained from the compressor stage of the engine, a lever mechanism connecting the capsules and the valve, the length of one capsule being dependent upon the ratio of two fluid pressures obtained from the compressor, and the length of the other being dependent upon the higher of the two pressures, such that when the ratio is below a predetermined limit the valve is positioned in response to both pressures, but when the ratio is above the predetermined limit the valve is positioned in response to the higher of the two pressures, and stops for limiting the travel of the lever mechanism.

---

This invention relates to fuel control apparatus whereby the quantity of fuel delivered to an associated gas turbine engine is determined by at least two fluid pressures derived from the engine compressor stage, said pressures being variable with changes in engine operating conditions.

In order to obtain optimum performance from a gas turbine engine, it has been proposed to control the flow of fuel during acceleration in the lower speed range in accordance with a first function of the compressor pressures, but as speed increases beyond a predetermined value, since this function becomes increasingly inappropriate, it is necessary to change the function to which the fuel control apparatus is responsive, and various forms of apparatus for carrying out this have been proposed.

The object of the invention is to provide a fuel control apparatus which is intended to carry out control of fuel supply to the engine in accordance with differing compressor pressure functions, in different speed ranges.

In accordance with the present invention a fuel control apparatus for a gas turbine engine comprises, in combination, a throttle whereby the rate of flow of fuel to the engine is controlled, a valve for controlling the escape of fuel past the throttle to provide a fuel pressure which is used to position the throttle, a pair of capsules, the length of one of which is dependent upon the ratio of two fluid pressures obtained in use from the compressor stage of the engine, and the length of the other of which is dependent upon changes in the higher of the two fluid pressures, a lever mechanism connecting the two capsules, the lever being connected between the capsules to said valve, and a pair of stops for limiting travel of the lever mechanism, the arrangement being such that when the ratio of the two fluid pressures is below a predetermined limit, the valve is positioned in accordance with a parameter related to both of said pressures, but when the ratio of the two fluid pressures is above the predeterimned limit, the lever mechanism reaches one of the stops and the parameter which determines the position of the valve is changed.

The invention will now be described by way of example with reference to the accompanying drawing, the single figure of which illustrates apparatus constructed in accordance with the invention.

The fuel control apparatus illustrated is intended for use with a gas turbine engine for controlling the supply of fuel delivered by a pump through an inlet 10 in a body 11 to an outlet 12, which communicates with the engine either directly or through further control apparatus.

To control the flow of fuel between the inlet 10 and the outlet 12 is a throttle comprising an apertured sleeve 13 within which is slidably mounted a piston assembly 14. The sleeve 13 is provided with at least one large aperture 15 through which fuel from the inlet 10 can enter the interior of the sleeve 13, and is provided also at an axially spaced position, with a plurality of smaller holes 16 arranged in a pattern, so that the flow to the outlet is determined by the proportion of the holes which are open to the inside of the sleeve 13 to those which are covered by a portion of the piston assembly 14.

The piston assembly is urged by a compression spring 17 towards its closed position in which all of the holes 16 are covered, and is also provided with a plate assembly 18 which prevents rotation of the piston assembly 14 in the body 11. The sleeve 13, however, is rotatably mounted in the body 10, and has connected to it for this purpose, a gear 19 which is driven in any convenient manner (not illustrated) by the associated engine, this gear being disposed in a chamber 20 which communicates with an outlet drain passage 21 which communicates with a low pressure portion of the system such as the inlet side of the pump. Rotation of the sleeve 13 reduces frictional resistance between the piston assembly 14 and the sleeve.

At the opposite end of the sleeve 13 from the spring 17, its bore is reduced to receive a spool valve 22 which through an internal passage 23 affords communication with the larger portion of the bore of the sleeve 13, this central passage 23 communicating with annuli 24, 25 which in turn communicate with a groove in the body 26, and with a further external annulus 27 in the sleeve 13. The groove 26 in the body 10 communicates with the inlet 10 and the position of the spool valve 22 determines the escape of fuel from the inlet into a passage 28 in the body, which in turn communicates with the chamber 20 surrounding the gear 19 and the outlet passage 21. This arrangement determines the pressure in the passage 23 in the valve 22, and thus the pressure which is exerted on the end of the piston assembly 14. This pressure acts against the spring 17 to determine the position of the throttle which is formed by the piston assembly 14.

At the end of the body 10 at which the valve 22 is disposed, there are two capsules 29, 30. The capsule 30 is evacuated, and the capsule 29 has its interior communicating with a passage 31, which in use, is connected to the engine inlet at the upstream side of the compressor stage.

In the body 10 there is a further inlet 32 which communicates with an intermediate stage or the downstream end of the compressor of the engine, and thus the length of the capsule 29 is determined by the ratio of the pressures in the compressor air inlets 31 and 32. The capsule 30, being evacuated, has its length determined by the pressure in the inlet 32, this pressure always being higher when the engine is in use than the pressure in the inlet 31.

The capsules 29, 30 at their free ends are connected to opposite ends respectively of a lever 33, and at a position between the two capsules, this lever 33 is connected to the spoil valve 22 by means of the hinge pin 24. In the body 10 adjacent to the ends of the lever 33 respectively are a pair of stops 34, 35 which are positioned to limit the travel of the lever and thus of the associated capsules 29 and 30 respectively.

In use, the position of the spool valve 22 is determined by the pressures obtaining in and around the capsules 29 and 30. In the low speed range, the ratio of the two pressures is such that the position of the lever 33 and thus of the valve 22 is determined in accordance with a parameter which is directly related to this ratio.

In order to obtain optimum acceleration conditions for the engine, however, this parameter becomes increasingly inappropriate, so that a change in the parameter controlling the valve 22 is required. In order to achieve this, the lever 33, when a predetermined speed and thus a predetermined pressure ratio has been reached, contacts the stop 34 so that the position of the lever 33 and of the valve 22 is thereafter determined by the higher of the two pressures which is that in the inlet 32.

The leverage afforded upon the valve 22 can be varied by the choice of the lengths of the arms of the lever 33 with respect to the connection 24 with the valve 22, and the connections at the ends of the lever 33 with the capsules 29 and 30 respectively.

It will be understood that other engine parameters related to compressor pressure can be applied to the lever mechanism with appropriate choice of the lengths of the arms of the lever 33, and with the choice of the positions in the engine compressor stage at which the pressure are obtained.

Having thus described my invention what I claim as new, and desire to secure by Letters Patent is:

1. A fuel control apparatus for a gas turbine engine comprising, in combination, a throttle whereby the rate of flow of fuel to the engine is controlled, a valve for controlling the escape of fuel past the throttle to provide a fuel pressure which is used to position the throttle, a pair of capsules, the length of one of which is dependent upon the ratio of two fluid pressures obtained in use from the compressor stage of the engine, and the length of the other of which is dependent upon changes in the higher of the two fluid pressures, a lever mechanism connecting the two capsules, the lever being connected between the capsules to said valve, and a pair of stops for limiting travel of the lever mechanism, the arrangement being such that when the ratio of the two fluid pressures is below a predetermined limit, the valve is positioned in accordance with a parameter related to both of said pressures, but when the ratio of the two fluid pressures is above the predetermined limit, the lever mechanism reaches one of the stops and the parameter which determines the position of the valve is changed.

2. A fuel control apparatus as claimed in claim 1 in which the lever mechanism has the two stops arranged to limit lengthwise changes in the two capsules respectively.

3. A fuel control apparatus as claimed in claim 1 in which the throttle comprises a piston which is axially movable against a spring under the influence of the fuel pressure derived from the valve.

4. A fuel control appartus as claimed in claim 1 in which the valve is in the form of a spool which is movable axially to control fuel flow by the lever mechanism.

5. A fuel control apparatus as claimed in claim 1 in which the capsule which is responsive only to the higher pressure is evacuated and is disposed in a chamber subjected to said higher pressure.

References Cited

UNITED STATES PATENTS

| | | | |
|---|---|---|---|
| 2,764,868 | 10/1956 | Watson et al. | 60—39.28 |
| 2,848,869 | 8/1958 | Russ | 60—39.28 |
| 2,946,188 | 7/1960 | Eastman | 60—39.28 |
| 2,950,596 | 8/1960 | Haase et al. | 60—39.28 |
| 3,002,348 | 10/1961 | Haase | 60—39.28 |
| 3,085,397 | 4/1963 | Jubb et al. | 60—39.28 |
| 3,091,925 | 6/1963 | May et al. | 60—39.28 |
| 3,164,161 | 1/1965 | Tyler | 60—39.28 X |
| 3,186,167 | 6/1965 | Chute | 60—39.28 |
| 3,230,709 | 1/1966 | Turner | 60—39.28 |
| 3,313,106 | 4/1967 | Matthews | 60—39.28 |

FOREIGN PATENTS

| | | |
|---|---|---|
| 576,208 | 5/1959 | Canada. |
| 985,520 | 3/1965 | Great Britain. |
| 1,020,541 | 2/1966 | Great Britain. |

AL LAWRENCE SMITH, Primary Examiner